C. ST. HILAIRE.
DEMOUNTABLE RIM.
APPLICATION FILED JULY 13, 1918.

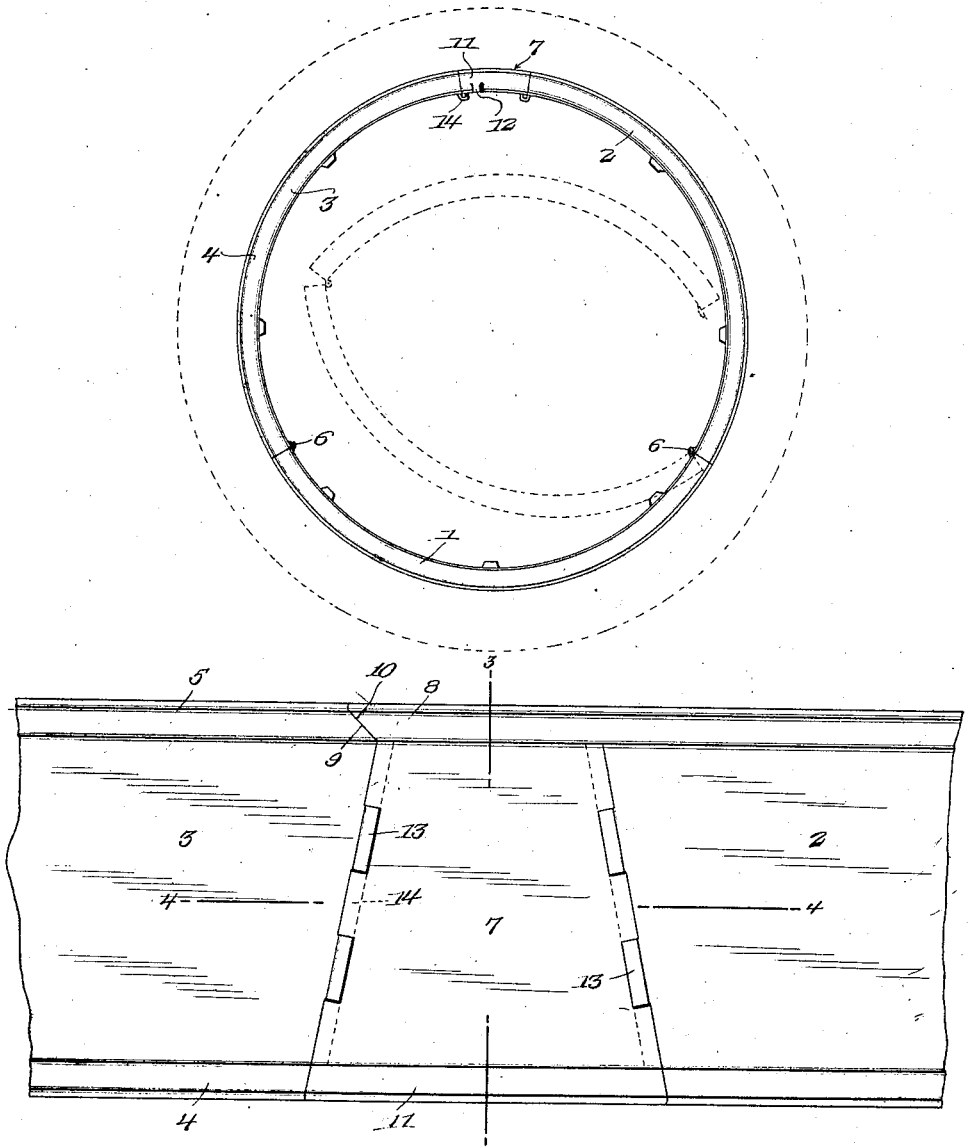

1,290,556.

Patented Jan. 7, 1919.
2 SHEETS—SHEET 2.

Witnesses
J. H. Crawford
J. W. Garner

Inventor
Carrol St. Hilaire,
By Victor J. Evans
Attorney

UNITED STATES PATENT OFFICE.

CARROL ST. HILAIRE, OF GARDNER, MASSACHUSETTS.

DEMOUNTABLE RIM.

1,290,556.      Specification of Letters Patent.      Patented Jan. 7, 1919.

Application filed July 13, 1918. Serial No. 244,734.

*To all whom it may concern:*

Be it known that I, CARROL ST. HILAIRE, a citizen of the United States, residing at Gardner, in the county of Worcester and State of Massachusetts, have invented new and useful Improvements in Demountable Rims, of which the following is a specification.

This invention relates to improvements in demountable rims for automobile wheels, the object of the invention being to provide an improved rim of this kind which may be readily collapsed or expanded without the use of tools and which is applicable to any vehicle wheel and is designed to hold any form of pneumatic or other tire.

With the above and other objects in view, the invention consists in the construction, combination and arrangement of devices hereinafter described and claimed.

In the accompanying drawings:—

Figure 1 is an elevation of a demountable rim constructed and arranged in accordance with my invention, showing the same expanded in full lines, and collapsed in dotted lines.

Fig. 2 is a detail plan of the same, showing the key member of the rim and the co-acting rim members.

Figure 3:
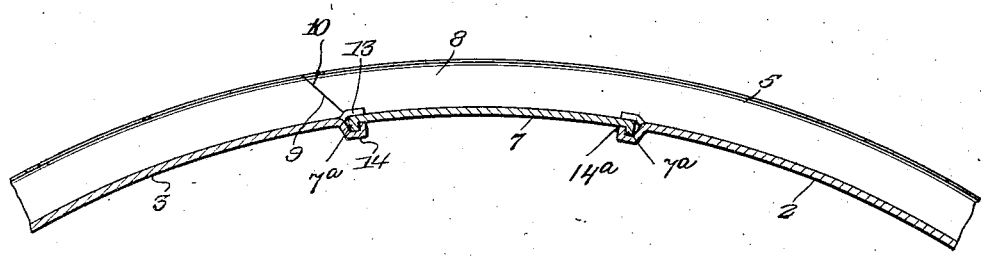
Fig. 3 is a detail sectional view of the same on the plane indicated by the line 4—4 of Fig. 2.
Figure 4:
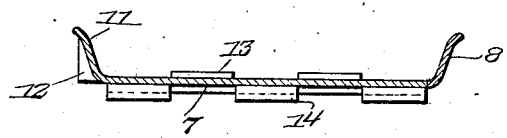
Fig. 4 is a similar view on the plane indicated by the line 3—3 of Fig. 2.
Figure 5:
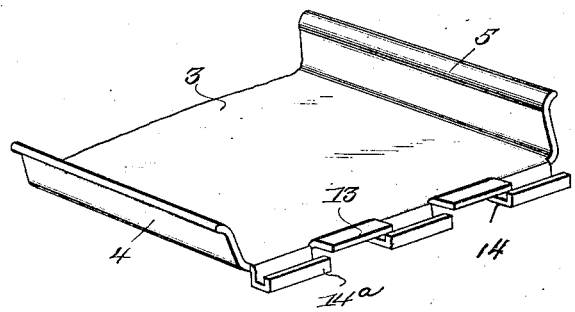
Fig. 5 is a detail perspective view of one end of one of the rim members showing the key guiding and holding lugs.

My improved demountable rim comprises segmental sections, of which any suitable number may be employed, three of such sections being here shown and which are respectively indicated at 1, 2 and 3. Preferably, the sections are made of sheet or plate steel but within the scope of the invention any suitable material may be employed. Each section is here shown as having outer and inner flanges 4, 5 and the sections 2, 3 are hinged as at 6 to the ends of the section 1 so that the sections may be arranged to collapse the rim as shown in dotted lines in Fig. 2 or may be arranged in a circle to fit the tire thereon as shown in full lines in Fig. 1. The rim is not liable to collapse at the hinges because the width of the outside flanges is greater than that of the inside flanges.

I also provide a key member 7 which is adapted to be arranged between the opposing ends of the members 2, 3 to complete the rim when the same is set up. The inner flange of the member 2 projects beyond the end of said member a distance equal to the width of the narrow end of the key member and said projecting flange, which is indicated at 8, is beveled at its end on its under side as at 9, the corresponding end 10 of the inner flange of the member 3 being beveled to receive said beveled end 9 so that an overlapping joint is formed between said ends of said inner flanges. The key member is arranged opposite one of the clips on the wheel to keep it from coming out.

The key member 7 is also made preferably of sheet or plate steel and is formed at its outer, broader end with a flange 11 for arrangement coincident with the outer flanges of the rim members 2, 3. To enable the key member to be readily driven into place I provide the same on the outer end with a thickened tip 12 which forms a suitable surface against which to strike with any suitable implement or a stone or the like and said tip also strengthens the key member at that point and prevents the flange thereof from being bent out of shape.

The opposing ends of the members 2, 3 are split and offset in directions to form inner and outer key guiding and holding lugs 13, 14 which are arranged alternately and between which the sides of the key member are slidably fitted, said ends of said members 2, 3 being oblique to correspond with the sides of said key member. The lugs 14 are bent to form flanges 14$^a$ which engage side flanges 7$^a$ with which the key member is provided so that the key also forms a tie to keep the rim from spreading apart.

The key member not only serves to connect the members 2, 3 but also while being forced into place between their opposing ends serves to expand the rim and to fit the same tightly within the tire as will be understood.

My improved rim greatly facilitates the operation of removing and replacing a tire, is not likely to get out of order, and may be manufactured at small cost.

While I have herein shown and described a preferred embodiment of my invention, I would have it understood that changes may be made in the form, proportion and construction of the several parts, without departing from the spirit of my invention, and within the scope of the appended claims.

Having thus described my invention, I claim:—

1. A demountable rim of the class described, comprising a series of arcuate members hinged together, the end members of said series being provided with guiding and holding lugs, and a key member adapted to be engaged with said lugs and inserted between said end members.

2. A demountable rim of the class described, comprising a series of arcuate members hinged together, the end members of said series being provided with guiding and holding lugs, and a key member adapted to be engaged with said lugs and inserted between said end members, the said key member being provided with a thickened portion forming a driving tip.

3. A demountable rim of the class described, comprising a series of arcuate members hinged together, the end members of said series being provided with guiding and holding lugs, and a key member adapted to be engaged with said lugs and inserted between said end members, one of said end members having an inner flange provided with an extended end which extends across the inner end of said key member.

4. A demountable rim of the class described, comprising a series of arcuate members hinged together, the end members of said series being provided with guiding and holding lugs, and a key member adapted to be engaged with said lugs and inserted between said end members, said holding and guiding lugs forming inner and outer offsets at the free ends of said end members and arranged to engage respectively on the inner and outer sides of said key member.

In testimony whereof I affix my signature.

CARROL ST. HILAIRE.

Copies of this patent may be obtained for five cents each, by addressing the "Commissioner of Patents, Washington, D. C."